United States Patent Office 2,974,083
Patented Mar. 7, 1961

---

2,974,083

INSECTICIDAL COMPOSITIONS

Moshe Neeman, Buffalo, N.Y., assignor to Wisconsin Alumni Research Foundation, Madison, Wis., a corporation of Wisconsin No Drawing. Filed Mar. 2, 1960, Ser. No. 12,272

10 Claims. (Cl. 167—30)

DDT is a potent contact insecticide showing long persistence and low acute toxicity for mammals. DDT has, however, often failed to kill insects in field use after a period of application, owing to the rapid development of DDT resistance in certain insect strains. When DDT is applied to an insect population, it kills selectively the more susceptible individuals, while those more resistant to DDT survive and breed a resistant population. This selective effect is repeated in successive generations as long as the application of DDT is continued, and the resistance is thus continually increased, until the insects are only slightly affected by the insecticide or remain entirely unaffected by it. The need for an improved insecticidal composition active against DDT resistant insects is thus evident.

To overcome the resistance of insects to DDT, it may be combined with suitable synergists, that is, substances which potentiate the insecticidal activity or enhance or restore the diminished or lost insecticidal effect of DDT on the resistant insects. The use of DDT with potent synergists can also limit the cumulative selection of DDT resistant insects in successive generations.

A number of DDT synergists have been proposed, but they are either not sufficiently potent, or they lack the necessary solubility in the solvents commonly used in the commercial formulation of insecticidal compositions of DDT, such as aliphatic, naphthenic and aromatic hydrocarbons, e.g. kerosene, decaline, tetraline, xylene, methylated naphthalenes and the like. Thus the two compounds N-methyl and N-ethyl-4-chlorobenzenesulfon-4'-chloroanilide have been reported to have synergistic activity with DDT, but their solubility in kerosene, decaline, xylene and similar solvents is too low to be of any practical value for the preparation of insecticidal compositions in the form of solutions or emulsifiable concentrates. Other proposed synergists are objectionable due to their relatively high toxicity to men and mammals, and again others are difficult and costly to produce and therefore not easily accessible. Still others lack sufficient chemical stability to be of any practical value in this field.

It is the object of the present invention to provide new synergists for DDT which have high biological potency, are non-toxic to man, mammals and plants, are easily accessible and possess adequate solubility in the solvents commonly used for the formulation of insecticidal compositions of DDT, along with high chemical stability and persistence in use.

The invention comprises insecticidal DDT compositions, containing at least one of the compounds represented by the following formula:

in which R is an n-alkyl radical having from 2 to 7 carbon atoms.

It has been found that compounds of this type are excellent and highly active synergists for DDT. They are highly soluble in hydrocarbons, which makes them very useful as active ingredients for the production of improved DDT-containing insecticidal compositions.

The product of the above formula, where R represents the ethyl group (p-chlorobenzenesulfonic acid-N-diethylamide), has been described in the literature and can be made in various ways including the reaction of 4-chlorobenzenesulfonyl halide with the appropriate di-alkylamine e.g. the reaction of 4-chlorobenzenesulfonyl chloride with diethylamine, as described in detail below.

EXAMPLE I

*p-Chlorobenzenesulfonic acid-N-di-n-propylamide*

One mole of 4-chlorobenzene sulfonyl chloride (211 g.) and water (100 ml.) were stirred, and 111 g. of di-n-propylamine (1.1 mole) was gradually added over a period of 30 minutes. This was followed by the gradual addition over a period of 30 minutes of an aqueous sodium hydroxide solution containing 44 g. of NaOH in 440 ml. solution (1.1 mole), while the reaction mixture was stirred and kept at 55–60° C. by warming on a water bath. After addition of the aqueous base, stirring was continued for an additional 2½–3 hours while the temperature was kept near 60° C. The reaction mixture was then cooled and the aqueous phase was drawn off from the supernatant oily product. A small amount of amine and product could be recovered by working up the aqueous layer together with washings of the oily layer. The oily product was washed with 2% aqueous hydrochloric acid and water, and dried over anhydrous sodium sulfate. The desired product was obtained as needles with a melting point of 26–27° C.

EXAMPLE II

*p-Chlorobenzenesulfonic acid-N-di-n-butylamide*

One mole of 4-chlorobenzene sulfonyl chloride (211 g.) and 142 g. of di-n-butylamine (1.1 mole) were reacted by the procedure described in Example 1. On completion of the reaction, the product crystallized on cooling and was separated from the aqueous liquid by filtration. The crystals were triturated with 2% aqueous hydrochloric acid and water, and were filtered off and subsequently air-dried. The desired product after recrystallization from ethanol was obtained as prisms with a melting point of 37–37.5° C.

EXAMPLE III

*p-Chlorobenzenesulfonic acid-N-di-n-amylamide*

One mole of 3-chlorobenzenesulfonyl chloride (211 g.) and 173 g. of di-n-amylamine (1.1 mole) were reacted by the procedure described in Example I. The desired product was obtained as an oil with a boiling point of 156° C./0.15 mm.

EXAMPLE IV

*p-Chlorobenzenesulfonic acid-N-di-n-hexylamide*

One mole of 4-chlorobenzenesulfonyl chloride (211 g.) and 204 g. of di-n-hexylamine (1.1 mole) were reacted as described in Example I. The desired product was obtained as an oil with a boiling point of about 170° C./0.04 mm.

EXAMPLE V

*p-Chlorobenzenesulfonic acid-N-di-n-heptylamide*

211 g. of 4-chlorobenzenesulfonyl chloride (1 mole) and 234 g. of di-n-heptylamine (1.1 mole) were reacted by the procedure described in Example I. The desired product was obtained as an oil with a boiling point of 175° C./0.015 mm.

The solubility in kerosene of the synergists according to the invention is satisfactory. The solubility of the N-diethyl compound is 11% by weight, that of the N-di-n-butyl compound 50% by weight, the other are miscible with kerosene in all proportions. The solubility of the N-diethyl compound in xylene is about 50%, the other compounds being miscible in all proportions with xylene. In practice, concentrated solutions of toxicants in xylene are used as emulsifiable concentrates, which are diluted with water before application to form insecticidal emulsions containing as a rule 20% or less of the concentrate. High solubility in xylene is therefore a very desirable property for a synergist.

The solubility of the compounds in other aromatic hydrocarbons is similar to that in xylene.

In addition to being soluble in kerosene and the like, the synergistic compounds of the present invention have the further advantage of being colorless, odorless and tasteless, thus causing no stains or off-flavors, e.g. when applied to fruits or vegetables and of being practically innocuous to plants and warm-blooded animals. For example, no toxic effects were observed on albino rats to which the compounds were applied at a dose of 1 g. per kg. body weight, by stomach tube, or at 0.5 g. per kg. by intraperitoneal injection. Furthermore, the compounds are practically insoluble in water and have low vapor pressure and high boiling points, as well as high chemical stability when exposed to the influence of light, air and moisture. They have, therefore, a long-lasting effect. In view of the high potency of the compositions of the present invention, they can be used to advantage with limited amounts of DDT, e.g. about 2–3% by weight of DDT, in combination with about 0.2–3% by weight of the potentiating agent, or mixtures of the same, to kill undesired DDT resistant insects such as flies. The use of relatively low amounts of DDT is of importance as the use of progressively increasing amounts of DDT, in attempts to kill DDT-resistant insects, has resulted in the killing of large numbers of desired insect species such as bees, along with the natural predators of harmful insects. Moreover, accumulation of DDT-residues reaches levels harmful to birds, wildlife and humans, unless the levels of DDT can again be reduced by the use of the potentiating agents.

According to the present invention, the new synergist-DDT combinations can be used for forming sprays for household and agricultural use in solution form dissolved in inert, organic solvents such as petroleum distillates of the kerosene type, solvent naphtha, hydrogenated naphthalenes, alkylated naphthalenes, chlorinated hydrocarbons and the like; or in the form of aqueous emulsions prepared from emulsifiable concentrates by conventional procedures. They may further be used in mixture with a conventional inert solid insecticide carrier material which may contain a wetting or a dispersing agent. The synergist-DDT combinations can also be prepared in aerosol form in accordance with conventional practices in this art.

The synergistic activity was proved by topically applying very dilute solutions of 0.175 $\mu$g. of DDT alone (as test solution), and admixed with 0.0175 $\mu$g. of each of the synergists, respectively, in 0.175 $\mu$l. of benzene to DDT-resistant house flies. Six hours after the application, the solution of DDT alone had killed only 5% of the flies; DDT in presence of the dipropyl product, 95%; in the presence of the diamyl product, 85%; with similar results being obtained with the other synergistic compounds. In similar tests with the diethyl product as the synergist, for example, 0.1% DDT killed about 7% of the flies; 1.0% synergist, 6.5%; and a combination made up of 0.1% DDT with 0.01% synergist killed 50% of the flies.

The tables in the following two examples show results of further laboratory tests demonstrating synergistic activity.

EXAMPLE VI

Solutions (see Table I below) were prepared by dissolving the active ingredients in refined kerosene, with the amount of solutes given in parts by weight contained in 100 parts by volume of the solution. Each of the resulting solutions was dispersed during 13 seconds by means of an atomizer to form an aerosol inside a chamber whose length, width and height were each 1 m., at the rate of 3 ml. solution per cubic meter. 75 house flies of both sexes of a DDT-resistant strain were exposed to the aerosol for 100 seconds while confined in a cage of wire netting (12 mesh to the inch), which was kept swinging within the spray chamber. The percent of flies knocked down immediately after exposure, and the percent of flies dead 6 hours after exposure, were recorded. Kerosene by itself had no effect on the flies.

Table I

| Dilution | Parts DDT | Parts Pyrethrins | Parts of Synergist | —R | Effect of space sprays of the solutions on DDT resistant house flies | |
|---|---|---|---|---|---|---|
| | | | | | Immediate knockdown, percent | Mortality 6 hours after exposure, percent |
| Kerosene | | | | | 0 | 0 |
| | 0.5 | | | | 36 | 23 |
| | | 0.01 | | | 97 | 8 |
| | 0.5 | 0.01 | | | 98 | 22 |
| | | | 0.5 | $C_2H_5$ | 3 | 11 |
| | | | 0.5 | n-$C_3H_7$ | 5 | 10 |
| | | | 0.5 | n-$C_4H_9$ | 2 | 7 |
| | | | 0.5 | n-$C_5H_{11}$ | 4 | 6 |
| | | | 0.5 | n-$C_6H_{13}$ | 2 | 2 |
| | | | 0.5 | n-$C_7H_{15}$ | 3 | 4 |
| | | 0.01 | 0.1 | $C_2H_5$ | 100 | 20 |
| | | 0.01 | 0.1 | n-$C_3H_7$ | 96 | 10 |
| | | 0.01 | 0.1 | n-$C_4H_9$ | 98 | 12 |
| | | 0.01 | 0.1 | n-$C_5H_{11}$ | 100 | 6 |
| | | 0.01 | 0.1 | n-$C_6H_{13}$ | 96 | 5 |
| | | 0.01 | 0.1 | n-$C_7H_{15}$ | 99 | 7 |
| | | | 0.05 | $C_2H_5$ | 81 | 78 |
| | 0.5 | | 0.05 | n-$C_3H_7$ | 69 | 88 |
| | 0.5 | | 0.05 | n-$C_4H_9$ | 67 | 87 |
| | 0.5 | | 0.05 | n-$C_5H_{11}$ | 53 | 92 |
| | | | 0.05 | n-$C_6H_{13}$ | 50 | 60 |
| | 0.5 | | 0.05 | n-$C_7H_{15}$ | 55 | 76 |
| | 0.5 | 0.01 | 0.05 | $C_2H_5$ | 100 | 97 |
| | 0.5 | 0.01 | 0.05 | n-$C_3H_7$ | 100 | 85 |
| | 0.5 | 0.01 | 0.05 | n-$C_4H_9$ | 98 | 61 |
| | 0.5 | 0.01 | 0.05 | n-$C_5H_{11}$ | 99 | 98 |
| | 0.5 | 0.01 | 0.05 | n-$C_6H_{13}$ | 96 | 59 |
| | 0.5 | 0.01 | 0.05 | n-$C_7H_{15}$ | 98 | 79 |

The synergistic effect of the synergistic compounds with DDT has been found to exist even when the compounds and DDT are applied to insects separately in two consecutive stages. The substantially complete extermination of DDT-resistant insects is thus accomplished in cases where DDT alone cannot achieve a kill, or can kill only a small part of the insect population, and this with relatively small amounts of the toxicants. The following example is illustrative.

EXAMPLE VII

Deposit A was prepared by spraying uniformly a kerosene solution containing 5 parts by weight of DDT in 100 parts by volume of the solution onto a glass surface, at the rate of 20 ml. solution per square meter. On evaporation of the solvent, a residual deposit of 1 g. DDT per square meter resulted.

Deposits B to F were prepared similarly, using kerosene solutions of 0.5 part by weight of each of the noted synergists according to the invention in 100 parts by volume of the solution, the residual deposits B to F of the synergists having a surface concentration of 0.1 g. per square meter.

DDT-resistant house flies were induced to walk for 90 seconds over each one of the deposits B to F, and subsequently for the same period over deposit A. The percent of completely paralyzed flies was recorded 3 hours after contact with the deposits. The results are shown in Table II.

Table II

| Deposit | Active Compound | | First contact | Second contact | Percent completely paralyzed flies 3 hrs. after contact |
|---|---|---|---|---|---|
| | DDT | Synergist —R | | | |
| | $G./m.^2$ | $G./m.^2$ | | | |
| (G) Glass sprayed with kerosene and dried | ---- | ---- | G | ---- | 0 |
| A | 1 | ---- | A | ---- | 15 |
| B | ---- | 0.1 | n-$C_3H_7$ | B | ---- | 15 |
| | | | | B | A | 98 |
| C | ---- | 0.1 | n-$C_4H_9$ | C | ---- | 17 |
| | | | | C | A | 97 |
| D | ---- | 0.1 | n-$C_5H_{11}$ | D | ---- | 15 |
| | | | | D | A | 100 |
| E | ---- | 0.1 | n-$C_6H_{13}$ | E | ---- | 18 |
| | | | | E | A | 100 |
| F | ---- | 0.1 | n-$C_7H_{15}$ | F | ---- | 12 |
| | | | | F | A | 100 |

In similar tests made with the diethyl product, where 13% of the flies were knocked down by the DDT alone and 4% by the synergist alone, an initial contact with the synergist followed by a contact with the DDT, knocked down 47% of flies.

The following tables contain illustrative data with Fowler strain DDT resistant house flies using a conventional spray or aerosol test. In the parts of Tables III–VIII marked A, the tests recorded were carried out on generations of flies highly resistant to DDT; in those marked B, flies of a lower degree of DDT-resistance were used. The test materials were dissolved in deodorized kerosene in the concentrations, in percent weight by volume, given in the following Tables III to VIII. In each test, 0.8 ml. of the test solution was discharged into a conventional Waters vertical spray tower through a glass atomizer at 10 lb. per square inch pressure. The spray descended through a stainless steel cylinder of 8 inches diameter and 44 inches height, at the bottom of which fifty house flies were confined in a cylindrical cage of 5 inches diameter and 2 inches height screened at top and bottom. The flies were transferred after spraying to clean cages, with access to food, and held for 24 hours for the observation of mortality. Each test was conducted in quadruplicate. In the tables, the synergist "$R(C_2H_5)$" is used to identify the product, p-chlorobenzenesulfonic acid-N-diethylamide; "$R(C_3H_7)$" is used to identify the product, p-chlorobenzenesulfonic acid-N-di-n-propylamide, etc.

Table III

| Percent Toxicant | | Percent Mortality |
|---|---|---|
| DDT | Synergist $R(C_2H_5)$ | |
| B | | |
| 4.0 | ---- | 50.5 |
| ---- | 0.1 | 0 |
| 4.0 | 0.1 | 83.5 |
| 2.0 | ---- | 27.0 |
| 2.0 | 0.1 | 76.0 |
| 0.25 | ---- | 18.5 |
| ---- | 5.0 | 12.5 |
| 0.25 | 5.0 | 73.0 |

Table IV

| Percent Toxicant | | Percent Mortality |
|---|---|---|
| DDT | Synergist $R(C_3H_7)$ | |
| A | | |
| 4.0 | ---- | 8.0 |
| ---- | 0.1 | 0 |
| 4.0 | 0.1 | 51.5 |
| 3.0 | ---- | 0 |
| ---- | 30.0 | 12.0 |
| 3.0 | 30.0 | 100.00 |

Table V

| Percent Toxicant | | Percent Mortality |
|---|---|---|
| DDT | Synergist $R(C_4H_9)$ | |
| A | | |
| 4.0 | ---- | 8.0 |
| ---- | 0.1 | 0 |
| 4.0 | 0.1 | 40.5 |
| B | | |
| 2.5 | ---- | 23.5 |
| ---- | 25.0 | 5.0 |
| 2.5 | 25.0 | 100 |
| 2.5 | 0.25 | 71.5 |

Table VI

| Percent Toxicant | | Percent Mortality |
|---|---|---|
| DDT | Synergist R($C_5H_{11}$) | |
| A | | |
| 4.0 | ---- | 8.0 |
| ---- | 0.1 | 0 |
| 4.0 | 0.1 | 32.5 |
| B | | |
| 3.0 | ---- | 57.5 |
| ---- | 0.09 | 0 |
| 3.0 | 0.09 | 82.5 |
| 1.5 | ---- | 33.0 |
| ---- | 15.0 | 0 |
| 1.5 | 15.0 | 100 |

Table VII

| Percent Toxicant | | Percent Mortality |
|---|---|---|
| DDT | Synergist R($C_6H_{13}$) | |
| A | | |
| 4.0 | ---- | 8.0 |
| ---- | 0.1 | 0 |
| 4.0 | 0.1 | 24.0 |
| B | | |
| 2.5 | ---- | 26.0 |
| ---- | 25.0 | 0 |
| 2.5 | 25.0 | 100 |
| 2.5 | 0.25 | 87.5 |

Table VIII

| Percent Toxicant | | Percent Mortality |
|---|---|---|
| DDT | Synergist R($C_7H_{15}$) | |
| B | | |
| 2.5 | ---- | 25.5 |
| ---- | 25.0 | 2.5 |
| 2.5 | 25.0 | 90.5 |
| 2.5 | 0.25 | 59.0 |

In the foregoing tests, synergistic activity has been demonstrated in the DDT compositions where the ratios of synergist to DDT ranges from one part of synergist to forty parts of DDT, up to ten parts of synergist to one part of DDT. The present invention is thus directed in particular to insecticidal DDT compositions for destroying insects resistant against the action of DDT alone, containing for each part of DDT, as a DDT potentiating agent, 0.025–10.0 parts of the potentiating agent or synergist, p-chlorobenzenesulfonic acid-N-di-(R)-amide, where R represents an n-alkyl group containing 2–7 carbon atoms. To obtain the substantial benefits of the present invention for field use, the DDT compositions should contain about 0.1% or more by weight of the synergist or potentiating agent. The modes of application of the insecticidal compositions according to the present invention are, as indicated, the usual ones for pesticides, e.g. as solution or emulsion sprays, aerosols, dips (e.g. for livestock), dusting powders, water suspensions of wettable powders, or by way of formation of residual deposits by spraying such solutions, emulsions or suspensions onto surfaces of the insect habitat and allowing the liquid carrier to evaporate. The dispersions, powders, solutions or emulsions may contain additional active ingredients, e.g. other insecticides such as pyrethrins, allethrin, lindane, methoxychlor, DDD (Rhothane), chlordane, aldrin, dialdrin, endrin, or organic phosphorus insecticides; acaricides such as benzyl benzoate or chloroalkyl-aryloxyalkyl-sulfites (e.g. aramite); fungicides, herbicides, bactericides and the like and various combinations of the same. The formulations may also contain additional ingredients such as wetting, spreading, adhesive or thickening agents, emulsion stabilizers, and the like. Except for the addition of the specified synergist or potentiating agent of the present invention, the formulations are preferably made in accordance with standard practices in are used to prepare conventional DDT formulations. The following examples are illustrative.

EXAMPLE VIII

Compositions A, B and C are useful as space sprays against flying insects, including DDT-resistant house flies.

Compositions D, E and F are useful as sprays for the formation of residual deposits after evaporation of the solvent.

Compositions G and H are useful for spraying from aircraft onto the water surface of the breeding places of mosquito larva.

Compositions I, J and K are useful as aerosol solutions, and are kept confined under somewhat higher than atmospheric pressure.

Composition L is an emulsifiable concentrate mainly for agricultural use. On dilution with water, spontaneous emulsification takes place, with production of a very stable emulsion of high toxicity to insects.

Composition M is an emulsion concentrate useful for the preparation of emulsions for residual sprays after dilution of one part of the concentrate with 4 parts of water.

Compositions N and O are useful as emulsifiable concentrates for the preparation of emulsion sprays by dilution with water for the protection of livestock against mange, lice, ticks, horn flies, stable flies, and DDT-resistant house flies.

Composition P is useful as an emulsifiable concentrate for the preparation of sprays by dilution with water for use against insects attacking cotton.

Composition Q is an emulsifiable concentrate which after dilution with water forms emulsions useful as delousing preparations.

Compositions R and S are useful as wettable powders, which form with water, under negligible foaming, highly stable aqueous suspensions.

Composition T is a useful insecticidal dusting powder.

In the compositions indicated in the table below, the emulsifying and/or surface active agents may be replaced by other suitable substances having the same or similar properties, e.g. mannitan monolaurate (MNO), sodium lauryl sulfate, sodium salts of sulfonated oxidized petroleum oils, Tween 80 (trademark), Lissapol N (trademark) Sterox CD (trademark), Igepal CA (trademark), Aerosol OT (trademark), and the like.

Table IX

| Composition | DDT, Parts | Synergist R= | Synergist Parts | Other Active Ingredients | Parts | Solid or Liquid Carrier, or Solvent | Parts | Emulsifier or Surface Active Agent | Parts | Other Ingredients | Parts |
|---|---|---|---|---|---|---|---|---|---|---|---|
| *1. INSECTICIDAL SOLUTIONS* | | | | | | | | | | | |
| A | 1 | n-$C_3H_7$ | 0.8 | Pyrethrins | 0.05 | Refined kerosene | 98.15 | | | | |
| B | 1 | n-$C_5H_{11}$ | 1.2 | Pyrethrins / Piperonyl butoxide | 0.08 / 0.7 | do | 97.02 | | | | |
| C | 0.8 | n-$C_3H_7$ | 0.6 | Pyrethrins | 0.05 | do | 98.55 | | | | |
| D | 5 | n-$C_3H_7$ | 3 | | | do | 92 | | | | |
| E | 4 | n-$C_4H_9$ | 2.5 | Lindane / Methoxychlor | 0.05 / 1 | do | 92.45 | | | | |
| F | 4 | n-$C_7H_{15}$ | 2.5 | Lindane / Methoxychlor | 0.05 / 1 | do | 92.45 | | | | |
| G | 5 | n-$C_5H_{11}$ | 8.5 | | | Kerosene / Fuel Oil | 44.5 / 42 | | | | |
| H | 5 | n-$C_6H_{13}$ | 8.5 | | | Kerosene / Fuel Oil | 44.5 / 42 | | | | |
| I | 2 | n-$C_5H_{11}$ | 1.5 | Allethrin | 0.6 | Xylene / Refined kerosene / Freon | 5 / 7.5 / 83.4 | | | | |
| J | 2 | n-$C_3H_7$ | 0.8 | Pyrethrins | 0.4 | Xylene / Refined kerosene / Freon | 5 / 7.5 / 84.3 | | | | |
| K | 2 | n-$C_7H_{15}$ | 1.5 | Pyrethrins / Piperonyl butoxide | 0.4 / 1.0 | Xylene / Refined kerosene / Freon | 5 / 6.5 / 83.6 | | | | |
| *2. INSECTICIDAL EMULSIFIABLE CONCENTRATES* | | | | | | | | | | | |
| L | 25 | n-$C_3H_7$ | 25 | Aramite | 1 | Xylene | 44 | Triton X-177 | 5 | | |
| M | 25 | n-$C_5H_{11}$ | 25 | | | do | 47.5 | Triton X-155 | 2.5 | | |
| N | 20 | n-$C_3H_7$ | 22 | Lindane / Methoxychlor | 1.2 / 5 | Aromatic hydrocarbon | 48.8 | Triton X-177 | 3 | | |
| O | 20 | n-$C_6H_{13}$ | 22 | Lindane / Methoxychlor | 1.2 / 5 | do | 48.8 | do | 3 | | |
| P | 16 | n-$C_3H_7$ | 20 | Aldrin / Parathion | 8 / 4 | do | 44 | Triton X-155 / Triton B-1956 | 3 / 5 | | |
| Q | 6 | n-$C_5H_{11}$ | 2 | Benzyl benzoate | 68 | | | Triton X-155 | 12 | Benzocaine | 12 |
| *3. DUSTING AND WETTABLE POWDERS* | | | | | | | | | | | |
| R | 25 | n-$C_5H_{11}$ / n-$C_4H_9$ | 5 / 3 | | | Pyrophyllite [1] | 65 | Triton X-100 / Tamol N | 0.5 / 1.5 | | |
| S | 25 | n-$C_3H_7$ / n-$C_7H_{15}$ | 3 / 2 | | | do[1] | 68 | Triton X-100 / Tamol N | 0.5 / 1.5 | | |
| T | 10 | n-$C_3H_7$ | 3 | | | Talc [1] | 86.9 | | | Coloring agent | 0.1 |

[1] The particle size of the solid carriers was between 0.5 to 40 microns. In the above formulations A to T, the synergist R=$C_2H_5$ was substituted for the other synergists for uses as indicated above.

The products referred to by the various trademarks mentioned above as well as in the following examples are as follows:

Tween 80—a polyoxyethylene derivative of sorbitan monooleate

Lissapol N—octylcresol poly-($C_8$–$C_{10}$) ether alcohol

Sterox CD—polyoxyethylene condensate

Igepal CA—condensate of ethylene oxide and alkylated cresol

Aerosol OT—dioctyl sodium sulfosuccinate

Triton X-177—a blend of an alkyl-aryl polyether alcohol and a modified phthalic glycerol alkyd resin with emulsion stabilizer, corrosion inhibitor and foam reducer Triton X-155—an alkyl-aryl polyether alcohol Triton X-100—an alkyl-aryl polyether alcohol Tamol N—a dispersant and stabilizer for spray mixtures Lindane—benzene hexachloride containing about 99% of the gamma-isomer Parathion—O,O'diethyl-O''-p-nitrophenyl thiophosphate Aldrin—hexachloro-hexahydro-dimethano-naphthalene Piperonyl butoxide—3,4-methylenedioxy-6-propylbenzyl-(butyl)-diethylene glycol ether.

Triton B-1956—a modified phthalic glycerol alkyd resin, a non-ionic surface-active agent.

A practical application of combinations containing DDT together with synergists according to the invention are illustrated in the following example:

EXAMPLE IX

Plywood panels were sprayed with a kerosene solution containing 5 parts by weight of DDT and 5 parts by weight of the synergist p-chlorobenzenesulfonic acid-N-di-n-propylamide in 100 parts by volume of the solution, at a rate of 20 ml. of solution per square meter. After drying, the residual deposit contained 1 g. of DDT and 1 g. of synergist per square meter. DDT-resistant house flies were kept in contact with the panels for 30 minutes, when complete kill resulted. In experiments using in a like manner the n-amyl synergist, or the n-heptyl synergist, complete kills of the insects were also achieved after 30 minutes.

The present application is a continuation-in-part of my prior applications Serial No. 574,628, filed March 29, 1956, and Serial No. 617,689, filed October 23, 1956, now both abandoned.

I claim:

1. Insecticidal DDT compositions for destroying insects resistant against the action of DDT alone, containing by weight for each part of DDT, as a DDT potentiating agent, 0.025 to 10 parts of p-chlorobenzenesulfonic acid-N-di-(R)-amide, where R represents an n-alkyl group containing 2 to 7 carbon atoms.

2. The composition of claim 1 where R represents the ethyl group.

3. The composition of claim 1 where R represents the n-propyl group.

4. The composition of claim 1 where R represents the n-butyl group.

5. The composition of claim 1 where R represents the n-amyl group.

6. The composition of claim 1 where R represents the n-hexyl group.

7. The composition of claim 1 where R represents the n-heptyl group.

8. Insecticidal spray compositions according to claim 1 dissolved in an inert organic solvent.

9. Insecticidal powdered compositions according to claim 1 dispersed in a solid insecticidal carrier.

10. Insecticidal aerosol spray compositions according to claim 1 carried in a propellant.

References Cited in the file of this patent

UNITED STATES PATENTS

| | | |
|---|---|---|
| 2,236,168 | Dietrich | Mar. 25, 1941 |

FOREIGN PATENTS

| | | |
|---|---|---|
| 119,980 | Sweden | Oct. 21, 1947 |
| 246,916 | Sweden | Nov. 1, 1947 |
| 633,136 | Great Britain | Dec. 19, 1951 |
| 929,905 | France | July 22, 1947 |
| 930,527 | France | Aug. 11, 1947 |

OTHER REFERENCES

U.S.D.A. Bull. E-775, April 1949, pp. 1-51; pp. 1 and 20 pert.

Sumerford: J. of Agr. and Food Chem., vol. 2, No. 6, Mar. 17, 1954, pp. 310-327 (pp. 318, 320 relied on).

Nature, vol. 177, Apr. 28, 1956, page 800.

Wadley: The Evidence Required to Show Synergistic Action of Insecticides and a Short Cut in Analysis, U.S.D.A., June 1945, pp. 1-7.

Hackh: Chem. Dictionary, 3rd ed., The Blakiston Co. (1944), p. 4.

Frear: Chem. of Insecticides, Fungicides and Herbicides, 2nd ed., 1948, D. Van Nostrand, pp. 62-63, 67, 68, 280-287.

King: U.S.D.A. Handbook No. 69, May 1954, pp. 67, 68.

UNITED STATES PATENT OFFICE
CERTIFICATE OF CORRECTION

Patent No. 2,974,083                      March 7, 1961

Moshe Neeman

It is hereby certified that error appears in the above numbered patent requiring correction and that the said Letters Patent should read as corrected below.

Column 2, line 54, for "0.15" read -- 0.015 --; column 3, line 31, for "0.2-3%" read -- 0.2-0.3% --; column 4, TABLE I, second column thereof, lines 17 and 21, strike out the leaders and insert instead -- 0.5 --; column 8, line 23, for "are" read -- art --.

Signed and sealed this 10th day of October 1961.

(SEAL)
Attest:

ERNEST W. SWIDER
Attesting Officer

DAVID L. LADD
Commissioner of Patents

USCOMM-DC